May 5, 1942.  P. D. MERRILL ET AL  2,281,781
T-FITTING AND VALVE
Filed March 17, 1939
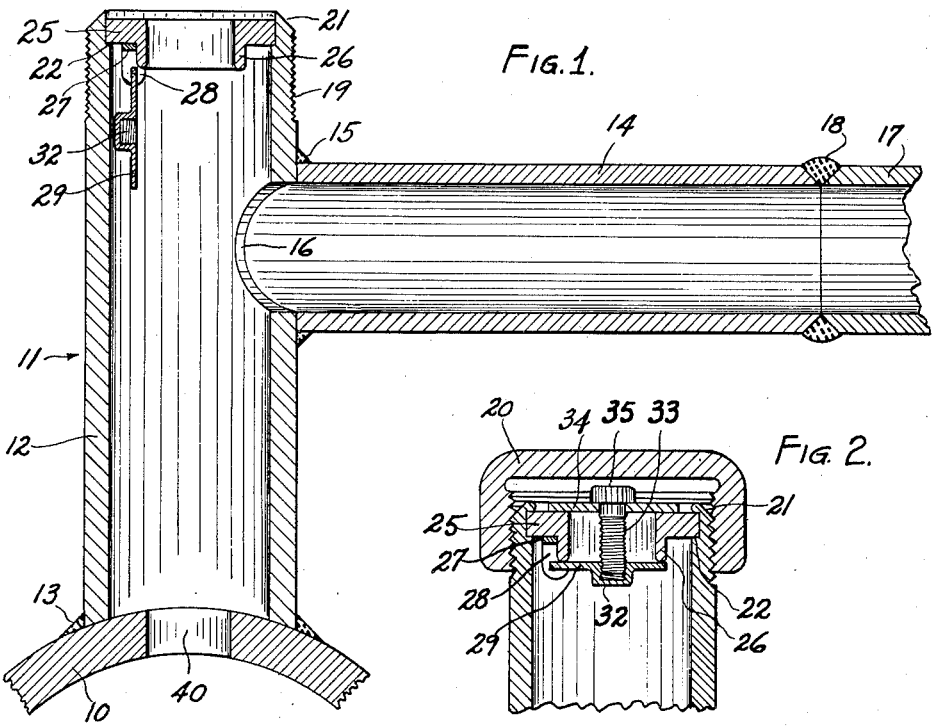
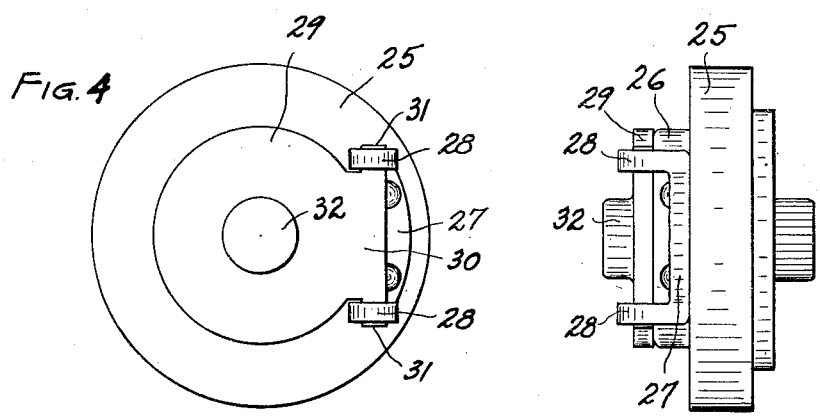
PATTERSON D. MERRILL
FREDERICK L. GREEN
INVENTORS.
BY Ottsch & Knoblock
ATTORNEYS.

Patented May 5, 1942

2,281,781

UNITED STATES PATENT OFFICE 2,281,781

T-FITTING AND VALVE

Patterson D. Merrill, South Bend, Ind., and Frederick L. Green, Irvington, N. Y., assignors to M. B. Skinner Company, South Bend, Ind., a corporation of Indiana Application March 17, 1939, Serial No. 262,350

1 Claim. (Cl. 137—69)

This invention relates to a T-fitting and valve, and more particularly to a device of this character employed in connection with gas lines for the purpose of connecting a branch conduit to a gas main.

Conventional practice in the use and application of a T-fitting is to weld one end of the cross piece of the same to a main, then connect the end of the base or center leg of the same to the branch conduit, then drill a hole in the main using the cross piece as a mounting for the drill, and then seal the exposed end of the cross piece, as by capping the same. This apparatus entails one serious objection, namely the escape of gas after the main has been tapped and until the cross piece has been capped. To overcome this objection, valve arrangements in connection with the T-fitting have been contemplated. One such arrangement involves the mounting of a valve on the free end of the cross piece of the fitting and exteriorly thereof, but this construction is comparatively expensive for retention as a permanent part of the fitting as is required, and the valve is of the manually operated type. Also, in general, valves for this use have been difficult to apply, expensive, or otherwise objectionable and impractical heretofore.

It is the primary object of this invention to provide an inexpensive device of this character having a valve which automatically closes when the drill used for tapping the main is removed from the cross piece of the fitting.

A further object is to provide a valve adapted to close automatically and provided with means for positively locking it in closed position.

A further object is to provide a simple valve adapted to seat within the fitting to permit passage of a drill through the fitting and to permit the end of the cross piece mounting the same to be capped.

A further object is to provide a novel valve construction for use in a T-fitting.

A further object is to provide a T-fitting with novel means for seating a valve therein.

Other objects will be apparent from the description and appended claim.

In the drawing:

Fig. 1 is a sectional view of the fitting and valve, with the latter illustrated in open position.

Fig. 2 is a fragmentary sectional view of the fitting and valve, illustrating the valve in closed position and the fitting capped.

Fig. 3 is an edge elevation of the valve element.

Fig. 4 is an end view of the valve element.

Referring to the drawing, which illustrates the preferred embodiment of the invention, the numeral 10 designates a gas main, and 11 the T-fitting for connection with the main. The fitting 11 comprises a cross piece 12 welded to the main at 13 at one end, and a base or center leg or piece 14 welded at one end at 15 to an intermediate portion of cross piece 12 at the margin of an aperture 16 in said cross piece. The branch conduit 17 is adapted to be welded to the free end of center leg 14 of the fitting at 18, or otherwise secured thereto with a sealed connection, as by a union.

The free end portion of cross piece 14 of the fitting is externally screw-threaded at 19 for mounting first a drilling adapter (not shown) and thereafter a sealing cap 20. The end portion of said cross piece is beveled at 21, preferably at a 45 degree taper. The interior of the free end of the cross piece 14 is machined accurately to provide a slightly reduced wall thickness and a shoulder 22.

A valve is seated in the machined end of cross piece 14 of the fitting. This valve comprises a body ring 25 fitting snugly in said machined portion and marginally supported by shoulder 22, said ring being narrower than the depth of the machined portion of said cross piece. At its inner side the ring 25 is provided with a reduced thickness tubular flange or neck 26 whose inner periphery merges with the inner periphery of the main body of ring 25. A U-shaped bracket having a curved base portion 27 and end ears 28 is fixedly secured to the inner side of ring 25 abutting the outer periphery of flange 26, said ears 28 projecting beyond the end of said flange and each having an aperture therein slightly disaligned from the outer edge of said flange. A valve plate 29 is adapted to seat on the end of flange 26, said plate being of substantially circular outline interrupted by a projecting coplanar tab portion 30 from opposite sides of the outer end of which project a pair of aligned pivots 31. Tab portion 30 of the valve plate fits between ears 28 of the U-bracket, with pivots 31 seating in the apertures of said ears. The parts are so proportioned and arranged that plate 29 may seat fully on the end of flange 26 to close the valve ring, or to hang or flap freely in the cross piece of the fitting parallel to the axis thereof and to one side of a projection of the inner periphery of ring 25. At its center the plate 29 has an integral off-set socket 32 which is internally screw-threaded. A locking member comprising a threaded stem 33 adapted for threaded connection with socket 32, an integral flange 34 of a diameter greater than the bore of ring 25 and adapted to seat on the outer face of said ring, and a hand piece 35, is adapted to lock said valve seated as illustrated in Fig. 1. The valve ring 25 is locked to place by crimping the projecting portion of the beveled end 21 of cross piece 14 thereover.

In use, the T-fitting, having the valve structure mounted and locked to place therein, is welded to the gas main 10 at 13, and to branch conduit 17 at 18. A suitable drilling apparatus (not shown) and including an adapter for connection with the fitting at threaded portion 19 is mounted on the fitting with the drill passing freely through the bore of the valve ring while valve plate 25 hangs free and clear of the drill. A hole 40 is then bored in gas main 10, whereupon the drill is disconnected and removed from the fitting. Immediately after removal of the drill, the pressure of gas entering the fitting serves to automatically seat valve plate 29 against the mouth of flange 26 to seal cross piece 14. The stem 33 of the locking member can then be threaded in socket 32 of valve plate 29 until flange 34 seats on valve ring 25. Thereafter cap 20 may be applied to place to form a secondary seal and to protect the valve.

While the locking member for the valve plate is not entirely essential, its use is a distinct advantage by reason of the fact that the flow of gas through the fitting to portion 14 sometimes creates eddy currents of gas adjacent the flap valve 25 which would result in valve flutter if the valve were not positively locked. This is positively prevented by the locking member which is easily applied by virtue of the fact that the contained gas pressure is strong enough to hold the flap valve plate in place during application of the locking member.

One of the advantages of this construction is the adaptability thereof for the purpose of sealing bore 40 in the gas main in the event it becomes necessary to repair the branch conduit 17. For instance, a seal member may replace the drill member in the drill apparatus above mentioned, and the same inserted through the valve ring to seat in opening 40 of the main with the valve plate held to open position by the seal member. The valve plate will automatically reseat upon removal of said seal element as before.

We claim:

In combination, a vertical conduit having an open upper end, a branch conduit intermediate said vertical conduit, a ring disposed in a channel in the inner periphery of said upper end of the conduit, an annular flange carried by the conduit end and overlying the upper side of the ring, a reduced diameter collar projecting downwardly from the ring within the conduit, a bracket having a curved base secured to said ring and having a pair of spaced arms at its ends, a valve plate pivoted to said arms and adapted to seat flat on the end of said collar, said valve plate being of a size to normally depend from said bracket free from the inner wall of said conduit, said valve plate having an internally threaded socket and a locking member having a stem threaded in said socket and a head seated on the upper end of said ring.

FREDERICK L. GREEN.
PATTERSON D. MERRILL.